(12) United States Patent
Ma et al.

(10) Patent No.: US 9,053,281 B2
(45) Date of Patent: Jun. 9, 2015

(54) DUAL-STRUCTURE CLOCK TREE SYNTHESIS (CTS)

(71) Applicant: Synopsys, Inc., Mountain View, CA (US)

(72) Inventors: Xiaojun Ma, Santa Clara, CA (US); Min Pan, Fremont, CA (US); Aiqun Cao, Sunnyvale, CA (US); Cheng-Liang Ding, Cupertino, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/221,139

(22) Filed: Mar. 20, 2014

(65) Prior Publication Data

US 2014/0289694 A1    Sep. 25, 2014

Related U.S. Application Data

(60) Provisional application No. 61/804,107, filed on Mar. 21, 2013.

(51) Int. Cl.
*G06F 17/50* (2006.01)

(52) U.S. Cl.
CPC ........ *G06F 17/5077* (2013.01); *G06F 17/5031* (2013.01); *G06F 17/505* (2013.01); *G06F 2217/62* (2013.01); *G06F 2217/84* (2013.01)

(58) Field of Classification Search
CPC .... G06F 2217/62; G06F 1/10; G06F 15/5077
USPC ................ 716/104, 115, 126, 129, 130, 134
See application file for complete search history.

(56) References Cited

U.S. PATENT DOCUMENTS

| | | | |
|---|---|---|---|
| 7,809,971 B2* | 10/2010 | Shimobeppu | 713/400 |
| 8,365,113 B1* | 1/2013 | Bhardwaj et al. | 716/106 |
| 8,539,402 B1* | 9/2013 | Bhardwaj et al. | 716/105 |
| 8,572,532 B1* | 10/2013 | Singh et al. | 716/108 |
| 8,640,066 B1* | 1/2014 | Gupta et al. | 716/108 |
| 2005/0050497 A1* | 3/2005 | Tetelbaum | 716/6 |
| 2007/0106970 A1 | 5/2007 | Fukuda | |
| 2007/0220466 A1 | 9/2007 | Davidovic | |

FOREIGN PATENT DOCUMENTS

| | | |
|---|---|---|
| JP | 2007072995 A | 3/2007 |
| JP | 2009076679 A | 4/2009 |
| JP | 2009288890 A | 12/2009 |

\* cited by examiner

*Primary Examiner* — Sun Lin
(74) *Attorney, Agent, or Firm* — Park, Vaughan, Fleming & Dowler LLP; Laxman Sahasrabuddhe

(57) ABSTRACT

Dual-structure clock tree synthesis (CTS) is described. Some embodiments can construct a set of upper-level clock trees, wherein each leaf of each upper-level clock tree is a root of a lower-level clock tree. Each upper-level clock tree can be optimized to reduce an impact of on-chip-variation and/or cross-corner variation on clock skew. Next, for each leaf of each upper-level clock tree, the embodiments can construct a lower-level clock tree to distribute a clock signal from the leaf of the upper-level clock tree to a set of clock sinks. The lower-level clock tree can be optimized to reduce latency, power consumption, and/or area.

15 Claims, 5 Drawing Sheets

Construct a set of upper-level clock trees, wherein each leaf of each upper-level clock tree is a root of a lower-level clock tree, and wherein each upper-level clock tree is optimized to reduce an impact of OCV and/or cross-corner variation on clock skew
702

For each leaf of each upper-level clock tree, construct a lower-level clock tree, wherein the lower-level clock tree distributes a clock signal from the leaf of the upper-level clock tree to a set of clock sinks, and wherein the lower-level clock tree is optimized to reduce latency, power consumption, and/or area
704

Construct a set of upper-level clock trees, wherein each leaf of each upper-level clock tree is a root of a lower-level clock tree, and wherein each upper-level clock tree is optimized to reduce an impact of OCV and/or cross-corner variation on clock skew
702

For each leaf of each upper-level clock tree, construct a lower-level clock tree, wherein the lower-level clock tree distributes a clock signal from the leaf of the upper-level clock tree to a set of clock sinks, and wherein the lower-level clock tree is optimized to reduce latency, power consumption, and/or area
704

DUAL-STRUCTURE CLOCK TREE SYNTHESIS (CTS)

RELATED APPLICATION

This application claims priority to U.S. Provisional Patent Application No. 61/804,107, by the same inventors, filed on 21 Mar. 2013, the contents of which are herein incorporated by reference in their entirety for all purposes.

BACKGROUND

1. Technical Field

This disclosure relates to clock tree synthesis (CTS). More specifically, this disclosure relates to dual-structure CTS.

2. Related Art

CTS refers to the process of creating a clock distribution network for distributing a clock signal to a set of sequential circuit elements in a circuit design. A circuit design may include multiple clock domains, and each clock domain can include multiple clock trees. The quality of the clock trees that are generated by CTS can have a significant impact on downstream stages in the EDA flow, especially on timing closure. Hence, what are needed are systems and techniques for CTS that can efficiently create high quality clock trees.

SUMMARY

Some embodiments described herein provide systems and techniques for constructing a clock tree. Some embodiments can construct a set of upper-level clock trees, wherein each leaf of each upper-level clock tree is a root of a lower-level clock tree, and wherein each upper-level clock tree can be optimized to reduce an impact of on-chip-variation (OCV) or cross-corner variation on clock skew. Next, for each leaf of each upper-level clock tree, the embodiments can construct a lower-level clock tree, wherein the lower-level clock tree distributes a clock signal from the leaf of the upper-level clock tree to a set of clock sinks. The lower-level clock tree can be optimized to reduce latency, power consumption, and/or area.

In some embodiments, wires in upper-level clock trees can have wider widths than wires in lower-level clock trees. In some embodiments, all horizontal wires of a given upper-level clock tree can be routed on the same metal layer. In some embodiments, all vertical wires of a given upper-level clock tree can be routed on the same metal layer. In some embodiments, all buffers in a given upper-level clock tree can have the same size.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are illustrative purposes only and are not intended to limit the embodiments to the forms disclosed.

Some EDA software tools enable circuit designers to describe the functionality that they want to implement. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

OCV and Timing-Criticality Aware CTS

Figure 1:
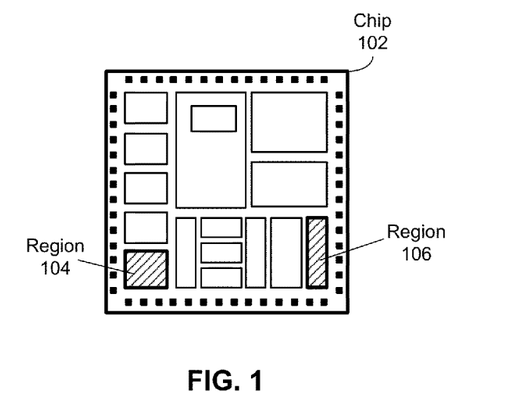
FIG. 1 illustrates how operating and process conditions can vary over a chip in accordance with some embodiments described herein.

OCV refers to variations in operating and process conditions over a chip. FIG. 1 illustrates how operating and process conditions can vary over a chip in accordance with some embodiments described herein. The voltage, temperature, and process parameters (e.g., channel length) can vary over chip 102. For example, the voltage, temperature, and process parameters in region 104 can be 3.2V, 72° F., and 0.26μ, respectively. On the other hand, the voltage, temperature, and process parameters in region 106 can be 3.4V, 68° F., and 0.24μ, respectively. OCV can affect one or more characteristics of a circuit element. For example, due to OCV, an instance of a cell in region 104 can have a different delay characteristic than an instance of the same cell in region 106.

In general, the amount of OCV between two locations increases with distance. For example, two identical cells that are located far from each other are expected to have a larger difference in their characteristics (e.g., delay) than two identical cells that are located close to each other. Additionally, the amount of OCV generally increases as the length of a path increases and/or the number of circuit elements in the path increases. For example, a longer wire is expected to have a more pronounced OCV effect than a shorter wire. Further, a path that has greater number of circuit elements is expected to have a larger OCV effect than a path that has fewer circuit elements.

Figure 2:
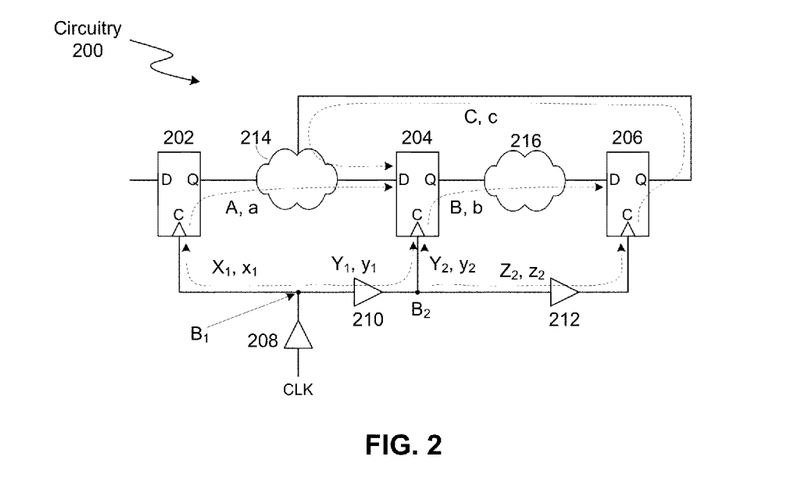
FIG. 2 illustrates how timing constraints can account for OCV variations in accordance with some embodiments described herein.

OCV can affect clock skew because OCV can cause the delay of circuit elements and wires to vary from their nominal values. Therefore, timing constraints need to account for this variation. FIG. 2 illustrates how timing constraints can account for OCV variations in accordance with some embodiments described herein. Circuitry 200 includes sequential circuit elements 202, 204, and 206. Each sequential circuit element has a clock input "C" that receives a clock signal, an output "Q" that launches a data signal based on the clock signal, and an input "D" which captures a data signal based on the clock signal. Although a "D flip-flop" has been used as an example of a sequential circuit element in FIG. 2, the sequential circuit elements 202, 204, and 206 can generally be any circuitry that is timed using a clock signal.

Combinational logic clouds 214 and 216 can include one or more wires and/or one or more combinational logic gates, but they do not include any sequential circuit elements. A data signal launched at an output of a sequential circuit element can pass through a combinational logic cloud before being captured at an input of another sequential circuit element. For example, the data signal launched by output "Q" of sequential circuit element 202 passes through combinational logic cloud 214 (where it may be logically combined with other data signals) before being captured at input "D" of sequential circuit element 204.

Clock signal "CLK" can be distributed to the sequential circuit elements using a clock tree that includes buffers 208, 210, and 212. The clock tree includes branch points $B_1$ and $B_2$ where the clock tree topology branches into multiple directions. As explained above, OCV can cause different instances of the same cell or wire to have different delays. Specifically, OCV can be modeled by using a range of delays (as opposed to using a single nominal delay) for a circuit element, e.g., by using a derating factor or by using a high and low delay value for the circuit element. Likewise, for a path, a high and low delay value can be computed by aggregating the high and low delay values, respectively, for the circuit elements in the path.

In FIG. 2, circuit paths are illustrated using a dashed line, and the high (i.e., slow path) and low (i.e., fast path) delay values for the circuit paths are represented using capital and small letters, respectively. For example, the high and low delay values from branch point B1 to the clock input "C" of sequential circuit element 202 are $X_1$ and $x_1$, respectively. The subscript "1" in the term "$X_1$" indicates that this delay value is from branch point $B_1$.

The data path delays have also been illustrated in FIG. 2. For example, the high and low delays from when the data signal is launched from output "Q" of sequential circuit element 202 to when the data signal is captured at input "D" of sequential circuit element 204 are "A" (high delay value) and "a" (low delay value).

In this disclosure, the capital letter that corresponds to the high delay value is also used for referring to the data path itself. For example, data path "A" refers to the data path from sequential circuit element 202 to sequential circuit element 204 that passes through combinational logic cloud 214. Note that the dashed line begins from the clock input "C" of sequential circuit element 202 (as opposed to beginning from output "Q") because the data path delay represented by the dashed line includes the launch delay, which is the delay between a clock edge arriving at clock input "C" and the data signal being launched from output "Q."

Using the path delays shown in FIG. 2, the OCV-aware setup timing constraints can be expressed as follows:

$$A+X_1-y_1<\Delta_A,$$

$$B+Y_2-z_2<\Delta_B, \text{ and}$$

$$C+Z_2-y_2<\Delta_C, \quad (1)$$

where $\Delta_A$, $\Delta_B$, and $\Delta_C$ are the setup timing requirements. Likewise, the OCV-aware hold timing constraints can be expressed as follows:

$$a+x_1-Y_1>\delta_A,$$

$$b+y_2-Z_2>\delta_B, \text{ and}$$

$$c+z_2-Y_2>\delta_C, \quad (2)$$

where $\delta_A$, $\delta_B$, and $\delta_C$ are the hold timing requirements.

The high and low delay values can be represented using a derating factor. Let d be the derating factor, and let the prime symbol (') indicate a nominal delay value. For example, let $x_1'$ be the nominal path delay from branch point $B_1$ to the clock input "C" of sequential circuit element 202. Then, the high and low delay values can be expressed as $X_1=x_1'+d \cdot x_1'$ and $x_1=x_1'-d \cdot x_1'$, respectively. Similar expressions can be derived for other high and low delay values. Using Equations (1), the clock skews $CS_A$, $CS_B$, and $CS_C$ for data paths "A," "B," and "C," respectively, can be expressed as follows:

$$CS_A=X_1-y_1=(x_1'-y_1')+d \cdot (x_1'+y_1'),$$

$$CS_B=Y_2-z_2=(y_2'-z_2')+d \cdot (y_2'+z_2'), \text{ and}$$

$$CS_C=Z_2-y_2=(z_2'-y_2')+d \cdot (z_2'+y_2'). \quad (3)$$

Note that the first term on the right hand side, e.g., $(x_1'-y_1')$, is the nominal clock skew (i.e., a difference between the nominal path delays), and the second term, e.g., $d \cdot (x_1'+y_1')$, represents the impact of OCV. Clock skew expressions can similarly be derived for the hold timing constraints.

There are a few important takeaways from Equations (3). First, note that the OCV clock skew component can only be minimized by minimizing the total (i.e., launch+capture) path latency from branch points, e.g., by minimizing $(x_1'+y_1')$.

Second, moving the branch point toward the root of the clock tree topology will result in higher total path latency from the branch point, which will result in a higher OCV clock skew component. Third, trying to minimize the nominal clock skew by adding insertion delay will likely worsen the OCV clock skew component because adding insertion delay increases the total path latency from the branch point. Conventional CTS approaches typically try to optimize the nominal clock skew. Based on the above discussion, it is clear that optimizing the OCV clock skew (i.e., reducing an impact of OCV on clock skew) is very different from the conventional clock skew optimization that is performed in conventional CTS.

Figure 3A:
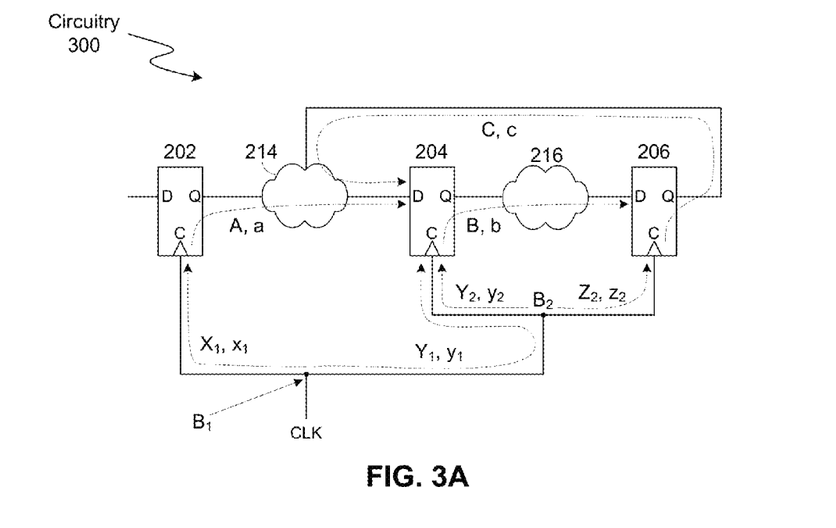
FIGS. 3A-3B illustrate how changing the clock tree topology can impact the OCV clock skew in accordance with some embodiments described herein.
Figure 3B:
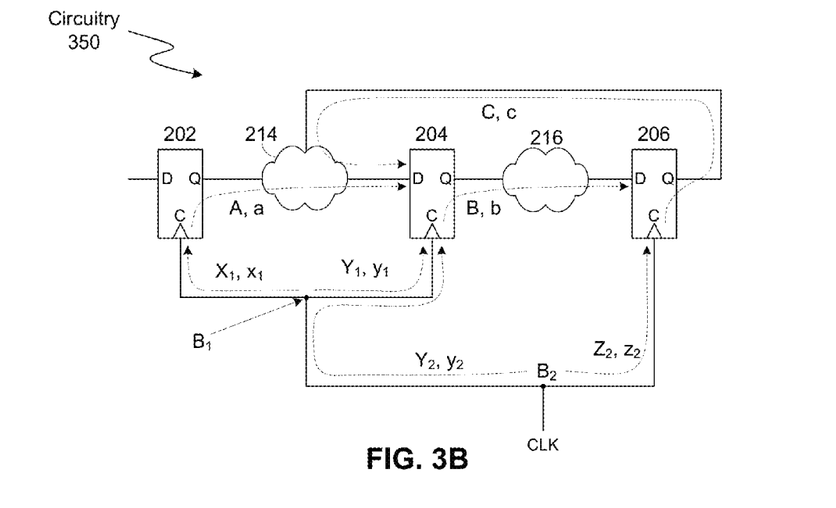

FIGS. 3A-3B illustrate how changing the clock tree topology can impact the OCV clock skew in accordance with some embodiments described herein. Buffers are not shown in FIGS. 3A-3B for the sake of clarity and ease of discourse. Circuitry 300 shown in FIG. 3A includes a clock tree topology in which branch point $B_1$ is farther from the leaves of the tree (and therefore is closer to the root of the tree), and branch point $B_2$ is closer to the leaves of the tree (and therefore is farther from the root of the tree). In contrast, in circuitry 350 shown in FIG. 3B, branch point $B_2$ is farther from the leaves of the tree, and branch point $B_1$ is closer to the leaves of the tree.

Note that, in circuitry 300, the OCV clock skew component for data path "A" is greater than the OCV clock skew component for data paths "B" and "C." This is because, in FIG. 3A, $(x_1'+y_1')>(y_2'+z_2')$. Conversely, in circuitry 350, the OCV clock skew component for data path "A" is less than the OCV clock skew component for data paths "B" and "C." This is because, in FIG. 3B, $(x_1'+y_1')<(y_2'+z_2')$.

Some embodiments described herein construct a clock tree topology that reduces the impact of OCV on clock skew for critical timing paths. For example, if data paths "B" and "C" are critical (e.g., the timing slack is negative or close to zero), but data path "A" is not critical, then some embodiments can use the clock tree topology shown in FIG. 3A. On the other hand, if data path "A" is critical, but data paths "B" and "C" are not critical, then some embodiments can use the clock tree topology shown in FIG. 3B. In general, reducing the OCV clock skew for a given timing path (i.e., reducing the impact of OCV on clock skew for a given timing path) can comprise reducing the total (i.e., launch+capture) path latency from the closest branch point (i.e., closest to the launch and capture sequential circuit elements) to the launch and capture sequential circuit elements.

Figure 4:
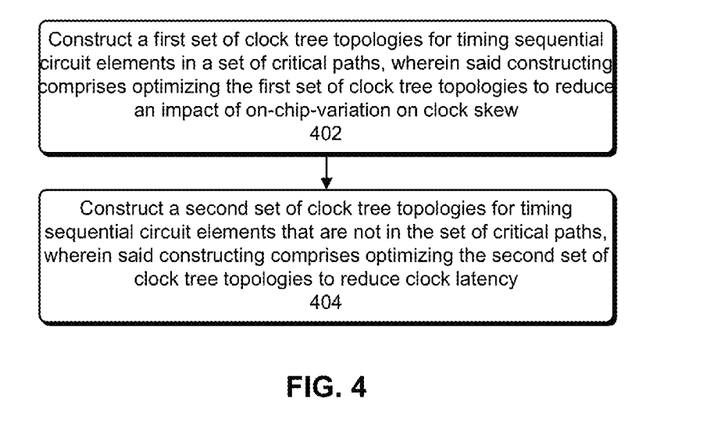
FIG. 4 illustrates a process for performing OCV and timing-criticality aware CTS in accordance with some embodiments described herein.

FIG. 4 illustrates a process for performing OCV and timing-criticality aware CTS in accordance with some embodiments described herein. The process can begin by constructing a first set of clock tree topologies for timing sequential circuit elements in a set of critical paths, wherein said constructing comprises optimizing the first set of clock tree topologies to reduce an impact of OCV on clock skew (operation 402).

Timing slacks and the corresponding timing paths can be determined by propagating the required times backward (i.e., from the timing end-points to the timing start-points) through the circuit design and propagating the arrival times forward (i.e., from the timing start-points to the timing end-points) through the circuit design. Next, the timing paths that correspond to violating timing slacks and optionally those that correspond to near-violating timing slacks can be identified as the set of critical paths. In some embodiments, the process may determine the set of critical paths by sorting timing paths based on their slack values, and selecting a predetermined number (or a predetermined percentage) of paths with the least slack.

As explained above, each critical path begins at an output (a timing start-point) of a launching sequential circuit element and ends at an input (a timing end-point) of a capturing sequential circuit element. For example, in FIG. 2, a critical path may begin at the "Q" output of sequential circuit element 202 and end at the "D" input of sequential circuit element 204. Note that the set of critical paths corresponds to a set of sequential circuit elements. For example, in FIG. 2, if the set of critical paths includes data paths "B" and "C," then the sequential circuit elements that are in the set of critical paths will include sequential circuit elements 202, 204, and 206. On the other hand, if the set of critical paths only includes data path "A," then the sequential circuit elements that are in the set of critical paths will include sequential circuit elements 202 and 204, but will not include sequential circuit element 206.

A set of clock tree topologies can include one or more clock tree topologies. For example, the net in FIG. 3A that distributes clock signal "CLK" to the clock inputs of sequential circuit elements 202, 204, and 206 is an example of "a set of clock tree topologies" that includes only one clock tree topology. The terms "optimize," "optimizing," and other such terms refer to processes that attempt to minimize or maximize a given objective function. Note that these optimization processes may terminate before the global minimum or maximum value of the objective function is obtained. Optimizing a set of clock tree topologies to reduce the impact that OCV has on clock skew can comprise determining an optimized location for a branch point in a clock tree topology. Specifically, the process can determine a branch point that is as close as possible to the two sequential circuit elements that are at the ends of a given critical path.

Referring to FIG. 4, the process can then construct a second set of clock tree topologies for timing sequential circuit elements that are not in the set of critical paths, wherein said constructing comprises optimizing the second set of clock tree topologies to reduce clock latency (operation 404). In some embodiments, a combination of metrics can be optimized together. For example, in operation 404, the process can try to optimize latency (e.g., minimize the maximum delay from the root of a clock tree to the leaves of the clock tree), power consumption (e.g., dynamic and/or leakage power consumption of a clock tree), and/or area (e.g., total cell area of buffers that are being used in a clock tree) of the clock tree topologies.

The second set of clock tree topologies can include completely new clock tree topologies and/or can include incremental extensions of existing clock tree topologies (e.g., incremental extensions of clock tree topologies that were created in operation 402). For example, in FIG. 2, let us assume that data path "A" is a critical path, but data paths "B" and "C" are not critical paths. Operation 402 may construct a clock tree topology that distributes clock signal "CLK" to the clock inputs of sequential circuit elements 202 and 204. Next, operation 404 may incrementally extend this clock tree topology by creating a branch from point $B_2$ to the clock input of sequential circuit element 206. (Note that operation 402 did not create this branch because sequential circuit element 206 was not on a critical path.)

Dual-Structure Clock Tree

Conventional CTS approaches construct a tree in a bottom-up fashion, i.e., these approaches start with the clock sinks (e.g., clock inputs of sequential circuit elements) and progressively build the tree toward the clock source. Unfortunately, OCV can cause the clock skew to vary significantly in clock trees that are built using conventional CTS approaches.

In contrast to conventional CTS approaches, some embodiments described herein construct a dual-structure clock tree using two types of clock trees, which are called upper-level clock trees and lower-level clock trees. An upper-level clock tree is built and optimized for distributing a clock signal over relatively long distances to different regions of the chip. An upper-level clock tree can be optimized to be OCV and/or cross-corner tolerant, e.g., by optimizing the upper-level clock tree to reduce the impact of OCV and/or cross-corner variation on clock skew. The leaves of an upper-level clock tree (called anchor buffers) serve as the roots of a lower-level clock tree. Specifically, from each leaf of an upper-level clock tree, a lower-level clock tree can be built and optimized to distribute the clock signal to clock sinks that are in proximity to the leaf of the upper-level clock tree.

Figure 5:
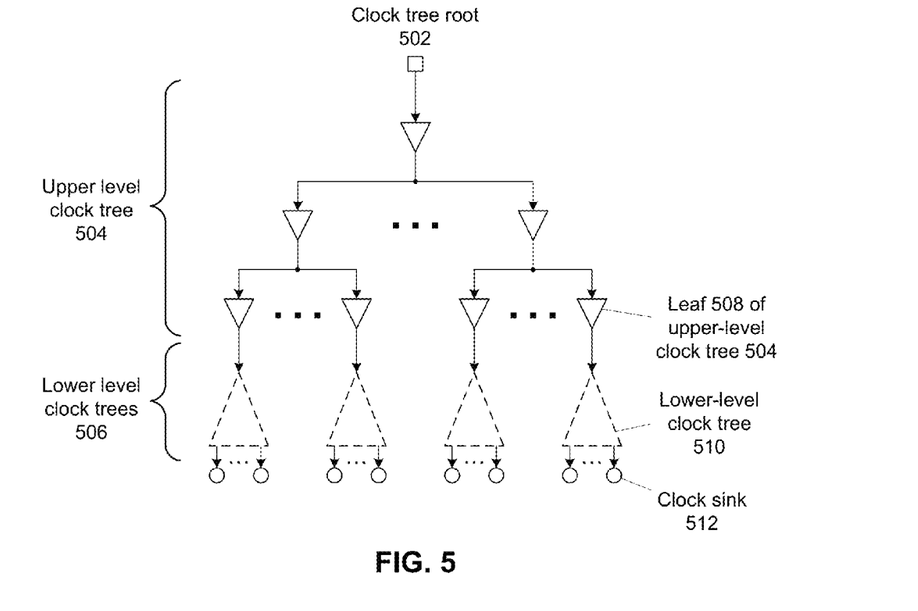
FIG. 5 illustrates a logical circuit diagram of a dual-structure clock tree in accordance with some embodiments described herein.

FIG. 5 illustrates a logical circuit diagram of a dual-structure clock tree in accordance with some embodiments described herein. Upper-level clock tree 504 distributes a clock signal from clock tree root 502 to the leaves of upper-level clock tree 504, e.g., leaf 508 of upper-level clock tree 504. Each leaf of an upper-level clock tree can be a clock buffer (called an anchor buffer in this disclosure). For example, leaf 508 can be an anchor buffer that drives a lower-level clock tree.

Lower-level clock trees 506 distribute the clock signal from a leaf of an upper-level clock tree to a set of clock sinks. Specifically, each leaf of each upper-level clock tree serves as the root of a lower-level clock tree, which distributes the clock signal to clock sinks that are in proximity to the leaf of the upper-level clock tree. For example, leaf 508 serves as the root of lower-level clock tree 510, which distributes the clock signal to clock sinks, e.g., clock sink 512, that are in proximity to leaf 508.

As mentioned above, an upper-level clock tree can be optimized to be tolerant to OCV, e.g., by optimizing the upper-level clock tree topology to reduce an impact of OCV on clock skew. Furthermore, in some embodiments, all of the buffers used in an upper-level clock tree can be instances of the same cell, or can be instances of the same type of cell with very similar sizes (e.g., if the cell library includes cells with a large range of cell sizes, then the cells that are used in the upper-level clock tree can be selected from a narrow range of cell sizes). Using buffers that have the same size can reduce the impact OCV has on clock skew because same sized buffers are expected to be affected in the same way by OCV. Additionally, the clock tree topology of the upper-level clock tree can have a regular structure which can help reduce the impact OCV has on clock skew. In some embodiments, the upper-level clock tree can use a greater wire width than the wire width that is used for lower-level clock trees. The electrical characteristics (e.g., capacitance and resistance) of a wider wire are generally more tolerant to OCV than a narrower wire. Moreover, all horizontal wires can be routed on the same metal layer (e.g., metal layer M4), and likewise all vertical wires can be routed on the same metal layer (e.g., metal layer M3) to reduce the impact of process variation across metal layers. In this manner, an upper-level clock tree can be optimized to reduce the impact of OCV on the characteristics (e.g., clock skew) of the clock tree.

Note that using identical devices and/or wire-widths not only reduces the impact of OCV, but also reduces cross-corner variation (also known as PVT variation). As explained above, OCV refers to the variation within different regions of a chip. Cross-corner variation or PVT variation, on the other hand, refers to the variations in process, voltage, and temperature across multiple corners which affect the entire chip. Typically, a chip is verified (e.g., for timing) across multiple corners (each corner is associated with a nominal process, voltage, and temperature value), and using identical devices and/or wire-widths also helps in reducing the variation in clock skew across multiple PVT corners.

Figure 6:
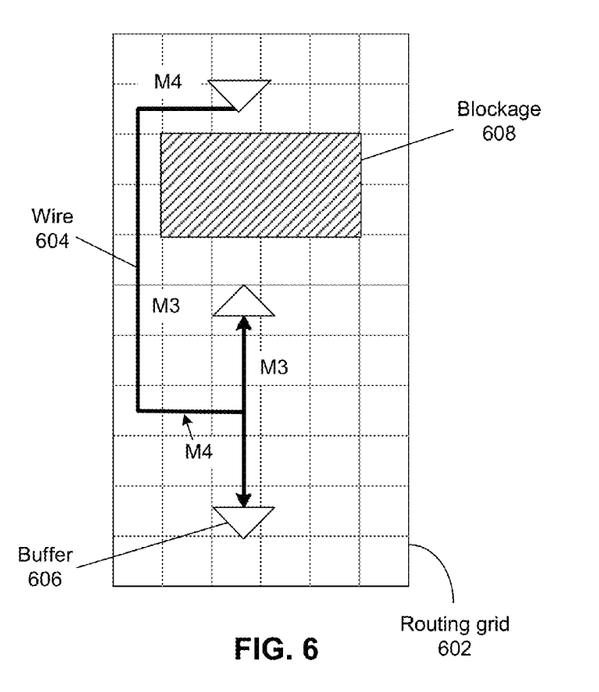
FIG. 6 illustrates a portion of an upper-level clock tree in accordance with some embodiments described herein.

FIG. 6 illustrates a portion of an upper-level clock tree in accordance with some embodiments described herein. The portion of the upper-level clock tree illustrated in FIG. 6 includes wires, such as wire 604, and buffers, such as buffer 606. Routing grid 602 can be used to route the wires of the clock tree, and routing and/or placement blockages, e.g., blockage 608, can be specified in routing grid 602. Note that wire 604 has been routed to avoid blockage 608. Additionally, note that all horizontal wires have been routed in the same metal layer, namely metal layer M4, and all vertical wires have been routed in the same metal layer, namely metal layer M3. In some embodiments, this can be achieved by creating a routing rule that forces the router to route all horizontal and vertical wires of an upper-level clock tree in respective metal layers. Additionally, as shown in FIG. 6, dual-structure CTS tries to share a common path as much as possible to reduce the impact that OCV has on clock skew.

Figure 7:
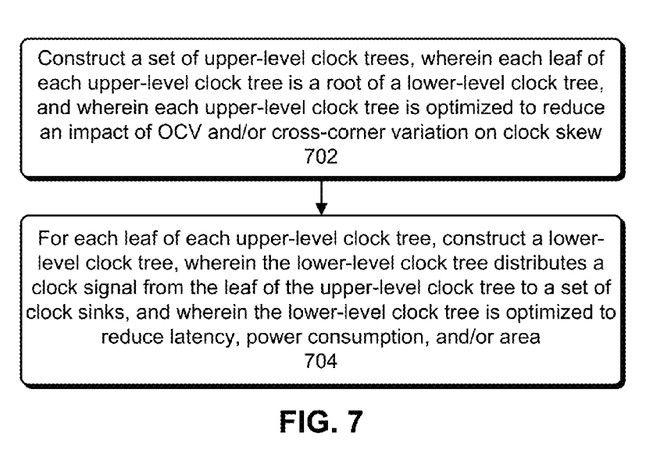
FIG. 7 illustrates a process for constructing a dual-structure clock tree in accordance with some embodiments described herein.

FIG. 7 illustrates a process for constructing a dual-structure clock tree in accordance with some embodiments described herein. The process can begin by constructing a set of upper-level clock trees, wherein each leaf of each upper-level clock tree is a root of a lower-level clock tree, and wherein each upper-level clock tree is optimized to reduce an impact of OCV and/or cross-corner variation on clock skew (operation 702).

The set of upper-level clock trees can include one or more upper-level clock trees. As explained above, an upper-level clock tree generally has longer wires than lower-level clock trees, has small fanouts for each clock buffer, and has few or no logic gates in the clock tree. Additionally, an upper-level clock tree may preferably have a regular topology for better OCV tolerance, and may have same/similar sizes of clock buffers to reduce the impact of device variations. Furthermore, upper-level clock trees can use matching wire lengths and metal layers for different branches of the tree to control interconnect variations. While constructing an upper-level clock tree, the process can (1) balance cell delay and wire delay across different process, voltage, and temperature corners, (2) use the same sized buffer throughout the clock tree, and (3) match routes of branches.

Next, for each leaf of each upper-level clock tree, the process can construct a lower-level clock tree, wherein the lower-level clock tree distributes a clock signal from the leaf of the upper-level clock tree to a set of clock sinks, and wherein the lower-level clock tree is optimized to reduce latency, power consumption, and/or area (operation 704).

As explained above, lower-level clock trees generally have shorter wire lengths than upper-level clock trees, have medium to large fanouts for each clock buffer/gate, and have a less regular structure due to uneven distribution of clock sinks and varied buffer sizes gates. In general, the fewer levels for the lower-level clock tree, the more OCV tolerant the clock tree.

In some embodiments, the maximum number of buffer levels in the lower-level clock tree can be constrained in order to reduce the impact of OCV. Specifically, to meet the maximum buffer level constraint, the lower-level clock trees may need to clone existing gates (e.g., clock gating cells) besides adding buffers. In some embodiments, the same clustering process is used for buffering and gates cloning. In some embodiments, the process can ensure that the lower-level clock tress are level balanced, which can further improve OCV tolerance.

In some embodiments, the number of levels in the lower-level clock tree is constrained to a predetermined maximum number, i.e., the number of buffers in each path from the root of the lower-level clock tree to the leaves of the lower-level clock tree is constrained to be less than or equal to the predetermined maximum number. Note that this maximum buffer level constraint also limits the size of the lower-level clock trees. Given a predetermined maximum buffer level constraint, the process can construct a set of lower-level clock trees by clustering clock sinks in the circuit design. The process can then identify tentative anchor buffer locations for the lower-level clock trees. Once the tentative anchor buffer locations have been determined, the process can create one or more upper-level clock trees to distribute the clock signal to the anchor buffers. In general, if the number of levels allowed in lower-level clock trees is small, then the number of lower-level clock trees will be larger. Conversely, if the number of levels allowed in lower-level clock trees is large, then the number of lower-level clock trees will be smaller.

Computer System

Figure 8:
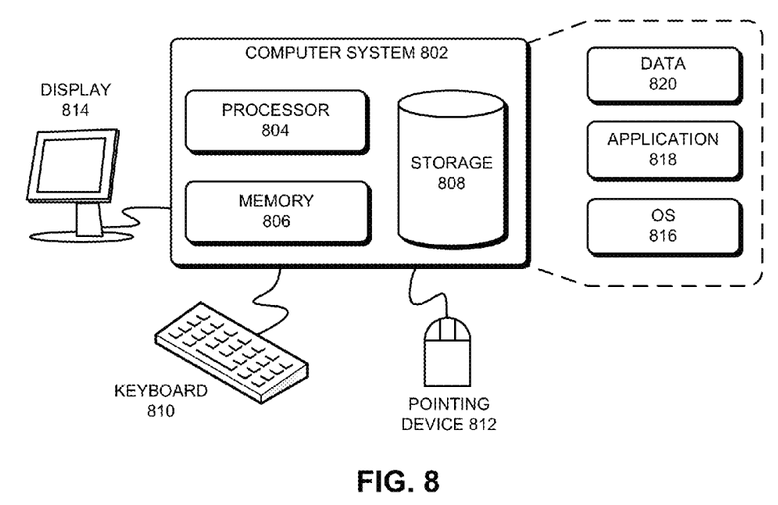
FIG. 8 illustrates a computer system in accordance with some embodiments described herein.

FIG. 8 illustrates a computer system in accordance with some embodiments described herein. Computer system 802 can include processor 804, memory 806, and storage device 808. Computer system 802 can be coupled to display device 814, keyboard 810, and pointing device 812. Storage device 808 can store operating system 816, application 818, and data 820. Data 820 can include input required by application 818 and/or output generated by application 818.

Computer system 802 may automatically (or with user interaction) perform one or more operations that are implicitly or explicitly described in this disclosure. Specifically, during operation, computer system 802 can load application 818 into memory 806. Application 818 can then be used to perform OCV and timing-criticality aware CTS, and/or to perform dual-structure CTS.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for clock tree synthesis in an electronic design automation (EDA) tool, the computer-implemented method comprising:

upon receiving a circuit design in which clock tree synthesis is to be performed, constructing, by using a processor, a set of upper-level clock trees, wherein each leaf of each upper-level clock tree is a root of a lower-level clock tree, wherein each upper-level clock tree is optimized to reduce an impact of on-chip-variation and/or cross-corner variation on clock skew, and wherein optimizing each upper-level clock tree includes optimizing at least one of: a topology of said each upper-level clock tree, buffers in said each upper-level clock tree, routing of said each upper-level clock tree, and a wire width used in said each upper-level clock tree; and for each leaf of each upper-level clock tree, constructing a lower-level clock tree, wherein the lower-level clock tree distributes a clock signal from said each leaf of said each upper-level clock tree to a set of clock sinks, wherein the lower-level clock tree is optimized to reduce latency, power consumption, and/or area, and wherein optimizing the lower-level clock tree includes optimizing at least one of: a topology of the lower-level clock tree, buffers in the lower-level clock tree, routing of the lower-level clock tree, and a wire width used in the lower-level clock tree.

2. The computer-implemented method of claim 1, wherein wires in the upper-level clock trees have wider widths than wires in the lower-level clock trees.

3. The computer-implemented method of claim 1, wherein all horizontal wires of a given upper-level clock tree are routed on a given metal layer.

4. The computer-implemented method of claim 1, wherein all vertical wires of a given upper-level clock tree are routed on a given metal layer.

5. The computer-implemented method of claim 1, wherein all buffers in a given upper-level clock tree have a given size.

6. A non-transitory computer-readable storage medium storing instructions that, when executed by a computer, cause the computer to perform a method for clock tree synthesis, the method comprising:

constructing a set of upper-level clock trees, wherein each leaf of each upper-level clock tree is a root of a lower-level clock tree, wherein each upper-level clock tree is optimized to reduce an impact of on-chip-variation and/or cross-corner variation on clock skew, and wherein optimizing each upper-level clock tree includes optimizing at least one of: a topology of said each upper-level clock tree, buffers in said each upper-level clock tree, routing of said each upper-level clock tree, and a wire width used in said each upper-level clock tree; and for each leaf of each upper-level clock tree, constructing a lower-level clock tree, wherein the lower-level clock tree distributes a clock signal from said each leaf of said each upper-level clock tree to a set of clock sinks, wherein the lower-level clock tree is optimized to reduce latency, power consumption, and/or area, and wherein optimizing the lower-level clock tree includes optimizing at least one of: a topology of the lower-level clock tree, buffers in the lower-level clock tree, routing of the lower-level clock tree, and a wire width used in the lower-level clock tree.

7. The non-transitory computer-readable storage medium of claim 6, wherein wires in the upper-level clock trees have wider widths than wires in the lower-level clock trees.

8. The non-transitory computer-readable storage medium of claim 6, wherein all horizontal wires of a given upper-level clock tree are routed on a given metal layer.

9. The non-transitory computer-readable storage medium of claim 6, wherein all vertical wires of a given upper-level clock tree are routed on a given metal layer.

10. The non-transitory computer-readable storage medium of claim 6, wherein all buffers in a given upper-level clock tree have a given size.

11. An apparatus, comprising:
a processor; and
a storage medium storing instructions that, when executed by the processor, cause the apparatus to perform a method for clock tree synthesis, the method comprising:
constructing a set of upper-level clock trees, wherein each leaf of each upper-level clock tree is a root of a lower-level clock tree, wherein each upper-level clock tree is optimized to reduce an impact of on-chip-variation and/or cross-corner variation on clock skew, and wherein optimizing each upper-level clock tree includes optimizing at least one of: a topology of said each upper-level clock tree, buffers in said each upper-level clock tree, routing of said each upper-level clock tree, and a wire width used in said each upper-level clock tree; and
for each leaf of each upper-level clock tree, constructing a lower-level clock tree, wherein the lower-level clock tree distributes a clock signal from said each leaf of said each upper-level clock tree to a set of clock sinks, wherein the lower-level clock tree is optimized to reduce latency, power consumption, and/or area, and wherein optimizing the lower-level clock tree includes optimizing at least one of: a topology of the lower-level clock tree, buffers in the lower-level clock tree, routing of the lower-level clock tree, and a wire width used in the lower-level clock tree.

12. The apparatus of claim 11, wherein wires in the upper-level clock trees have wider widths than wires in the lower-level clock trees.

13. The apparatus of claim 11, wherein all horizontal wires of a given upper-level clock tree are routed on a given metal layer.

14. The apparatus of claim 11, wherein all vertical wires of a given upper-level clock tree are routed on a given metal layer.

15. The apparatus of claim 11, wherein all buffers in a given upper-level clock tree have a given size.

* * * * *